United States Patent
Scherer et al.

(10) Patent No.: US 8,779,075 B2
(45) Date of Patent: Jul. 15, 2014

(54) USE OF NONIONIC SURFACTANTS AS EMULSIFIERS FOR EMULSION POLYMERIZATION (III)

(75) Inventors: Markus Scherer, Köln (DE); Thomas Schliwka, Bergisch Gladbach (DE); Katharina Hömberg, Hilden (DE); Uwe Held, Velbert (DE); Thomas Mausberg, Haan (DE); Ronald Klagge, Erkrath (DE)

(73) Assignee: Cognis IP Management GmbH, Duesseldorf (DE)

( * ) Notice: Subject to any disclaimer, the term of this patent is extended or adjusted under 35 U.S.C. 154(b) by 0 days.

(21) Appl. No.: 13/259,846

(22) PCT Filed: Mar. 13, 2010

(86) PCT No.: PCT/EP2010/001606
§ 371 (c)(1),
(2), (4) Date: Sep. 23, 2011

(87) PCT Pub. No.: WO2010/108613
PCT Pub. Date: Sep. 30, 2010

(65) Prior Publication Data
US 2012/0029131 A1    Feb. 2, 2012

(30) Foreign Application Priority Data

Mar. 24, 2009 (EP) ................................ EP09004160

(51) Int. Cl.
*C08F 2/30* (2006.01)
(52) U.S. Cl.
USPC ........... 526/209; 524/378; 524/755; 524/757; 524/804

(58) Field of Classification Search
USPC .................. 526/209; 524/378, 755, 757, 804
See application file for complete search history.

(56) References Cited

U.S. PATENT DOCUMENTS

| | | | |
|---|---|---|---|
| 6,391,923 B1 * | 5/2002 | Pollmann et al. | 514/714 |
| 2007/0105982 A1 * | 5/2007 | Roschmann et al. | 523/201 |
| 2009/0289220 A1 | 11/2009 | Klagge et al. | |
| 2009/0292072 A1 * | 11/2009 | Klagge et al. | 524/811 |

FOREIGN PATENT DOCUMENTS

| | | |
|---|---|---|
| DE | 19939266 | 2/2001 |
| DE | 10234840 | 11/2003 |
| JP | 63-319035 | 12/1988 |

OTHER PUBLICATIONS

"Machine Translation of DE10234840", Nov. 27, 2003, 13 pages.
"Machine Translation of DE19939266", Feb. 8, 2001, 10 pages.
"PCT International Search Report for PCT/EP2010/001606", May 7, 2010, 2 pages.

* cited by examiner

*Primary Examiner* — Vu A Nguyen
(74) *Attorney, Agent, or Firm* — Servilla Whitney LLC

(57) ABSTRACT

The invention relates to the use of aqueous solutions of nonionic surfactants as gel phase free emulsion systems for emulsion polymerization. The nonionic surfactants are chosen from the group (a) of the addition products from 1 to 40 mol ethylene and/or propylene oxide per mol of allyl alcohol, and (b) of the addition products from 1 to 40 mol ethylene and/or propylene oxide per mol of allyl alcohol, wherein the OH-group of said addition products is end-capped in the sense that it is substituted by a group OR, wherein R is an alkyl group with 1 to 20 C-atoms, which can be saturated or unsaturated, straight chained or branched.

12 Claims, No Drawings

USE OF NONIONIC SURFACTANTS AS EMULSIFIERS FOR EMULSION POLYMERIZATION (III)

CROSS-REFERENCE TO RELATED APPLICATIONS

This application is the National Stage entry of PCT/EP2010/001606, filed on Mar. 13, 2010, which claims priority to European Patent application number EP09004160, filed on Mar. 24, 2009, both of which are incorporated herein by reference in their entireties.

FIELD OF THE INVENTION

The invention relates to the use of specific surfactants as emulsifiers for emulsion polymerization, also to the polymer dispersions which can be produced using these surfactants, and to a process for producing these polymer dispersions.

BACKGROUND

Emulsion polymerization is a specific polymerization process in which monomers of low water solubility are emulsified in water with the help of emulsifiers and are polymerized using water-soluble initiators such as potassium peroxodisulfate or redox initiators. Anionic and/or nonionic surfactants are the essential constituents here. Via micelle formation in the aqueous solution, they ensure the process of emulsion polymerization.

In the course of emulsion polymerization processes, surfactants are often diluted with water or are introduced into an aqueous reaction solution; the surfactants are then present in the concentration required for the emulsion polymerization process. Here, the surfactants generally pass through a wide concentration range, particularly if they are present beforehand as 100% strength systems, i.e. are water-free. The operating temperature here is often in the range around 25° C. Many surfactants exhibit a miscibility gap with water as a function of the temperature and the concentration. This means that in said gap they are not soluble in water, which manifests itself in the formation of an insoluble gel block which prevents immediate further processing of the reaction mixture. This is an extremely undesired process.

SUMMARY

According to one or more embodiments, provided is process for producing aqueous latices by emulsion polymerization, the process comprising: mixing one or more monomers with a gel-phase-free emulsifier system, wherein the gel-phase-free emulsifier system comprises an aqueous solution, and wherein the aqueous solution comprises one or more nonionic surfactants, wherein the nonionic surfactants are selected from the group consisting of
  (a) the addition products of from 1 to 40 mol of ethylene oxide and/or propylene oxide per mole onto allyl alcohol, and
  (b) the addition products of from 1 to 40 mol of ethylene oxide and/or propylene oxide per mole onto allyl alcohol, where the OH group of these addition products is terminally capped in the sense that it is replaced by a group OR, where R is an alkyl radical having 1 to 20 carbon atoms which may be saturated or unsaturated, straight-chain or branched.

Other embodiments provide a process for stabilizing aqueous latices produced by emulsion polymerization, the process comprising adding one or more nonionic surfactants (a) or (b) to aqueous latices after emulsion polymerization. Also provided are polymer dispersions produced by these processes.

DESCRIPTION OF THE INVENTION

The object of the present invention was to provide aqueous surfactant solutions which are suitable as gel-phase-free emulsifier systems for emulsion polymerization. In other words, the central object which was to be achieved by the emulsifier systems to be developed was to effectively prevent the occurrence of gel phases which are triggered by adding surfactants or aqueous surfactant solutions in the course of emulsion polymerization processes.

Moreover, the use of such emulsifier systems in emulsion polymerization should be associated with only slight coagulation.

The present invention firstly provides the use of aqueous solutions of nonionic surfactants as gel-phase-free emulsifier systems for emulsion polymerization, where the nonionic surfactants are selected from the group
  (a) of the addition products of from 1 to 40 mol of ethylene oxide and/or propylene oxide per mole onto allyl alcohol, and
  (b) of the addition products of from 1 to 40 mol of ethylene oxide and/or propylene oxide per mole onto allyl alcohol, where the OH group of these addition products is terminally capped in the sense that it is replaced by a group OR, where R is an alkyl radical having 1 to 20 carbon atoms which may be saturated or unsaturated, straight-chain or branched.

Surprisingly, it has been found that the nonionic surfactants which are selected from the group
  (a) of the addition products of from 1 to 40 mol of ethylene oxide and/or propylene oxide per mole onto allyl alcohol, and
  (b) of the addition products of from 1 to 40 mol of ethylene oxide and/or propylene oxide per mole onto allyl alcohol, where the OH group of these addition products is terminally capped in the sense that it is replaced by a group OR, where R is an alkyl radical having 1 to 20 carbon atoms which may be saturated or unsaturated, straight-chain or branched,
are characterized in that their aqueous solutions are gel-phase-free. Consequently, these nonionic surfactants and their aqueous surfactant concentrates can be diluted with water as desired without gel phases and, as a result of these, water-insoluble gel blocks occurring in certain concentration ranges.

With regard to the use of aqueous solutions of nonionic surfactants as gel-phase-free emulsifier systems for emulsion polymerization where the nonionic surfactants are selected from the groups (a) and (b) defined above, the following applies:

In a preferred embodiment, the surfactants are selected exclusively from the compounds of class (a).

In a further preferred embodiment, the surfactants are selected exclusively from the compounds of class (b).

In a further preferred embodiment, the surfactants are selected exclusively both from the compounds of class (a) and also the compounds of class (b), i.e. exclusively mixtures of compounds (a) and (b) are used as emulsifiers.

The present invention further provides a process for producing aqueous latices by emulsion polymerization, where, in the course of the emulsion polymerization, aqueous solutions of nonionic surfactants are used as gel-phase-free emulsifier systems, where the nonionic surfactants are selected from the group (a) of the addition products of from 1 to 40 mol of ethylene oxide and/or propylene oxide per mole onto allyl alcohol, and (b) of the addition products of from 1 to 40 mol of ethylene oxide and/or propylene oxide per mole onto allyl alcohol, where the OH group of these addition products is terminally capped in the sense that it is replaced by a group OR, where R is an alkyl radical having 1 to 20 carbon atoms which may be saturated or unsaturated, straight-chain or branched.

In one embodiment of the process according to the invention, as emulsifiers, besides one or more surfactants from the group of the compounds (a) and (b), additionally one or more surfactants which are selected from the group (c) of the compounds of the formula $R^1$—O—X—$R^2$, where X is a segment which is composed of 1 to 40 ethylene oxide and/or propylene oxide units linked together and in which the radicals $R^1$ and $R^2$, independently of one another, are alkyl radicals having 1 to 20 carbon atoms, which may in each case be saturated or unsaturated, straight-chain or branched, with the proviso that the radicals $R^1$ and $R^2$ are not allyl radicals, (d) of the compounds of the formula $R^3$—O—X—H, where X is a segment which is composed of 1 to 40 ethylene oxide and/or propylene oxide units linked together and in which $R^3$ is an alkyl radical having 1 to 20 carbon atoms, which may be saturated or unsaturated, straight-chain or branched, with the proviso that $R^3$ is not an allyl radical, and (e) of the compounds of the formula H—O—X—H, where X is a segment which is composed of 1 to 40 ethylene oxide and/or propylene oxide units linked together, are used as further emulsifiers.

The compounds (a) to (e) in each case contain a segment which is composed of 1 to 40 ethylene oxide units (EO) and/or propylene oxide units (PO) linked together. This segment can either be composed exclusively of EO units or exclusively of PO units. However, it is also possible that it consists both of EO units and of PO units; in this case, the EO units and PO units may be in random distribution or be present in a blockwise fashion. The synthesis of the compounds (a) to (e) can take place by methods especially known solely to the person skilled in the art. In particular, the customary techniques of ethoxylation and/or propoxylation are applicable for introducing the EO/PO segments: these generally take place at elevated temperature and increased pressure in the presence of suitable alkoxylation catalysts. The choice of alkoxylation catalyst here influences the so-called homolog distribution. Thus, in the presence of the catalytically effective alkali metal alcoholates such as sodium ethylate, a broad homolog distribution is achieved, whereas for example in the presence of hydrotalcites as catalyst, a severely narrowed homolog distribution (so-called "narrow range" products) is achieved.

Compounds (a)

The compounds (a) are addition products of from 1 to 40 mol of ethylene oxide and/or propylene oxide per mole onto allyl alcohol.

Compounds (b)

The compounds (b) are addition products of from 1 to 40 mol of ethylene oxide and/or propylene oxide per mole onto allyl alcohol, where the OH group of these addition products is terminally capped in the sense that it is replaced by a group OR, where R is an alkyl radical having 1 to 20 carbon atoms which may be saturated or unsaturated, straight-chain or branched.

Compounds (c)

The compounds (c) are compounds of the formula $R^1$—O—X—$R^2$, where X is a segment which is composed of 1 to 40 ethylene oxide units and/or propylene oxide units linked together and in which the radicals $R^1$ and $R^2$, independently of one another, are alkyl radicals having 1 to 20 carbon atoms which may in each case be saturated or unsaturated, straight-chain or branched, with the proviso that the radicals $R^1$ and $R^2$ are not allyl radicals.

Compounds (d)

The compounds (d) are compounds of the formula $R^3$—O—X—H, where X is a segment which is composed of 1 to 40 ethylene oxide units and/or propylene oxide units linked together and in which $R^3$ is an alkyl radical having 1 to 20 carbon atoms which may be saturated or unsaturated, straight-chain or branched, with the proviso that $R^3$ is not an allyl radical.

Compounds (e)

The compounds (e) are compounds of the formula H—O—X—H, where X is a segment which is composed of 1 to 40 ethylene oxide units and/or propylene oxide units linked together.

The compounds to be used according to the invention from group (a) and (b)—if desired in combination with compounds from group (c), (d) and (e)—can be used as the sole emulsifiers (primary emulsifiers) during the emulsion polymerization. However, it is also possible to use them together with one or more anion-active, cationic or (further) nonionic emulsifiers (different from the compounds (a) to (e)).

In a preferred embodiment, the nonionic emulsifiers according to the invention are used in combination with anionic emulsifiers, in particular those which are selected from the group of fatty alcohol sulfates, fatty alcohol ether sulfates, sulfosuccinates, alkylarylsulfonates, alkyl aryl ether sulfates, alkyl sulfates, fatty acid sulfonates, phosphate esters, olefin sulfates, alkanesulfonates, α-sulfomono-carboxylic acid esters known to the person skilled in the art.

The emulsifiers to be used in the course of the process according to the invention from group (a) and (b)—if desired in combination with compounds from group (c), (d) and (e)—if they are added during the emulsion polymerization—are used in an amount of from 0.5 to 10% by weight, preferably from 1 to 5% by weight and in particular from 1 to 3% by weight—the % by weight data is in each case based on the total amount of the monomers used during the emulsion polymerization.

However, it may also be desired to carry out the emulsion polymerization in the presence of other emulsifiers which are selected in particular from the group of nonionic and/or anionic surfactants, and to meter in one or more emulsifiers from group (a) and (b)—if desired in combination with compounds from group (c), (d) and (e)—to the finished latices only once the polymerization is complete, where they then act in the sense of a post-stabilization of the aqueous latices.

In a further embodiment, the compounds of group (a) and (b)—if desired in combination with compounds from group (c), (d) and (e)—are used both during the emulsion polymerization and also after the emulsion polymerization. In this case, it may be desired to use the compounds of group (a) and (b)—if desired in combination with compounds from group (c), (d) and (e)—in a mixture with other surfactants or as sole surfactants. In one variant, the emulsion polymerization is started in the presence of classic anionic surfactants or mixtures of classic anionic and nonionic surfactants and then one or more emulsifiers from group (a) and (b)—if desired in combination with compounds from group (c), (d) and (e)— are used towards the end of the emulsion polymerization and additionally after the end of the polymerization; in this variant, the emulsifiers of group (a) and (b)—if desired in combination with compounds from group (c), (d) and (e)—act firstly as emulsifiers during the emulsion polymerization and secondly in the sense of a post-stabilization of the aqueous latices.

For the post-stabilization, the compounds of group (a) and (b)—if desired in combination with compounds from group (c), (d) and (e)—irrespective of whether they have also already been used during the emulsion polymerization, are used in an amount of from 0.1 to 10% by weight, preferably from 0.1 to 5% by weight and in particular from 0.1 to 3% by weight—the % by weight data is in each case based on the total amount of the monomers used during the emulsion polymerization.

The nature of the polymers and copolymers in the aqueous latices is not subject to any particular limitation. However, particular preference is given to polymers and/or copolymers based on the following monomer building blocks: acrylic acid, acrylic acid esters, butadiene, methacrylic acid, methacrylic acid esters, styrene, vinyl acetate and vinyl versatate.

A further subject matter of the invention is aqueous polymer dispersions obtainable by the process according to the invention described above.

EXAMPLES

Substances Used

FA-30EO: addition product of 30 mol of ethylene oxide onto a fatty alcohol (Disponil LS 30, Cognis)
Breox I: ethylene oxide addition product onto allyl alcohol (Breox AA E 450 H, Cognis)
Disponil AFX 3070: modified ethoxylated fatty alcohol (Cognis)

Example 1

According to the Invention

A surfactant mixture was prepared by mixing the following components: 455 g of FA-30E0 and 195 g of Breox I. The active substance content of the mixture was 100%. To test the gel behavior, the surfactant mixture according to the invention was continuously diluted with demineralized water at 25° C. and with stirring until its concentration was 30%. During the entire dilution process, no gel phases occurred, i.e. the surfactant mixture remained completely dissolved in water; the aqueous solution exhibited no inhomogeneities. At the concentrations given in table 1, in each case a sample was taken and slowly cooled in a temperature bath until its setting point was reached. Table 1 shows the relationship between concentration C and the setting point S.

TABLE 1

| Conc. [%] | 95 | 90 | 85 | 80 | 75 | 70 | 65 | 60 | 55 | 50 | 45 | 40 | 35 | 30 |
|---|---|---|---|---|---|---|---|---|---|---|---|---|---|---|
| Setting pt. [° C.] | 24 | 22 | 21 | 18 | 14 | 8 | 3 | −8 | −10 | −18 | −18 | −11 | −12 | −12 |

Example 2

For Comparison 300 g of Disponil AFX 3070 were diluted with demineralized water according to the procedure in example 1 in the concentration range from 65% to 35%. At the concentrations given in table 2, a sample was taken and investigated as to its setting point as described in example 1. Table gives the corresponding setting points. In the concentration range from ca. 60% to ca. 40%, the solution exhibits a miscibility gap, which became evident from the formation of a gel block.

TABLE 2

| | Conc. [%] | | | | |
|---|---|---|---|---|---|
| | 70 | 60 | 50 | 40 | 30 |
| Setting pt. [° C.] | 8 | 24 | 32 | 25 | −6 |

Properties of the Latices

The use of the emulsifiers according to example 1 had no negative effects at all on the properties of the latices produced using them in the emulsion polymerization. This was irrespective of the nature of the monomers used for the polymerization—in particular acrylate, styrene/acrylate and VeoVa monomer systems were tested.

Furthermore, it was observed that the polymer dispersions produced using the surfactant mixtures according to the invention have increased shear stability.

The invention claimed is:
1. A process for producing aqueous latices by emulsion polymerization, the process comprising:
    mixing one or more monomers with a gel-phase-free emulsifier system, wherein the gel-phase-free emulsifier system comprises an aqueous solution, and wherein the aqueous solution comprises one or more nonionic surfactants, and wherein the nonionic surfactants are selected from the group consisting of:
    (a) the addition products of from 1 to 40 mol of ethylene oxide and/or propylene oxide per mole onto allyl alcohol, and
    (b) the addition products of from 1 to 40 mol of ethylene oxide and/or propylene oxide per mole onto allyl alcohol, where the OH group of these addition products is terminally capped in the sense that it is replaced by a group OR, where R is an alkyl radical having 1 to 20 carbon atoms which may be saturated or unsaturated, straight-chain or branched, and
wherein the emulsifier system further comprises one or more surfactants which are selected from the group consisting of:

(c) the compounds of the formula $R^1$—O—X—$R^2$, where X is a segment which is composed of 1 to 40 ethylene oxide and/or propylene oxide units linked together and in which the radicals $R^1$ and $R^2$, independently of one another, are alkyl radicals having 1 to 20 carbon atoms, which may in each case be saturated or unsaturated, straight-chain or branched, with the proviso that the radicals $R^1$ and $R^2$ are not allyl radicals, (d) the compounds of the formula $R^3$—O—X—H, where X is a segment which is composed of 1 to 40 ethylene oxide and/or propylene oxide units linked together and in which $R^3$ is an alkyl radical having 1 to 20 carbon atoms, which may be saturated or unsaturated, straight-chain or branched, with the proviso that $R^3$ is not an allyl radical, and (e) the compounds of the formula H—O—X—H, where X is a segment which is composed of 1 to 40 ethylene oxide and/or propylene oxide units linked together.

2. The process of claim 1, wherein the aqueous solution comprises one or more nonionic surfactants that are the addition products of from 1 to 40 mol of ethylene oxide and/or propylene oxide per mole onto allyl alcohol, and the emulsifier system comprises one or more surfactants that are the compounds of the formula $R^1$—O—X—$R^2$, where X is a segment which is composed of 1 to 40 ethylene oxide and/or propylene oxide units linked together and in which the radicals $R^1$ and $R^2$, independently of one another, are alkyl radicals having 1 to 20 carbon atoms, which may in each case be saturated or unsaturated, straight-chain or branched, with the proviso that the radicals $R^1$ and $R^2$ are not allyl radicals.

3. A process for producing aqueous latices by emulsion polymerization, the process comprising:
mixing one or more monomers with a gel-phase-free emulsifier system, wherein the gel-phase-free emulsifier system comprises an aqueous solution, and wherein the aqueous solution comprises one or more nonionic surfactants, and wherein the nonionic surfactants are selected from the group consisting of:
(a) the addition products of from 1 to 40 mol of ethylene oxide and/or propylene oxide per mole onto allyl alcohol, and
(b) the addition products of from 1 to 40 mol of ethylene oxide and/or propylene oxide per mole onto allyl alcohol, where the OH group of these addition products is terminally capped in the sense that it is replaced by a group OR, where R is an alkyl radical having 1 to 20 carbon atoms which may be saturated or unsaturated, straight-chain or branched, and
adding the surfactants from the groups (a) and (b) to the latices after emulsion polymerization for post-stabilization.

4. The process as claimed in claim 1, wherein the emulsifier system further comprises one or more anionic, cationic, and/or nonionic surfactants, wherein the nonionic surfactants are different from the compounds (a) to (e).

5. The process as claimed in claim 1, further comprising adding the surfactants from the groups (a) and (b) to the latices after emulsion polymerization for post-stabilization.

6. The process as claimed in claim 1, wherein the one or more monomers are selected from the group consisting of acrylic acid, acrylic acid esters, butadiene, methacrylic acid, methacrylic acid esters, styrene, vinyl acetate and vinyl versatate.

7. The process as claimed in claim 1, wherein the one or more nonionic surfactants comprises the addition products of from 1 to 40 mol of ethylene oxide and/or propylene oxide per mole onto allyl alcohol.

8. The process as claimed in claim 1, wherein the one or more nonionic surfactants comprises the addition products of from 1 to 40 mol of ethylene oxide and/or propylene oxide per mole onto allyl alcohol, where the OH group of these addition products is terminally capped in the sense that it is replaced by a group OR, where R is an alkyl radical having 1 to 20 carbon atoms which may be saturated or unsaturated, straight-chain or branched.

9. The process as claimed in claim 3, wherein the emulsifier system further comprises one or more anionic, cationic, or nonionic surfactants, wherein the nonionic surfactants are different from the compounds (a) to (e).

10. The process as claimed in claim 1, wherein the total weight of nonionic surfactants is from 0.5 to 10% of the total weight of monomers used during the emulsion polymerization.

11. The process as claimed in claim 1, wherein the total weight of nonionic surfactants is from 1 to 3% of the total weight of monomers used during the emulsion polymerization.

12. The process as claimed in claim 1, wherein the emulsifier system is gel-phase-free at 25° C. when the concentration of nonionic surfactants in the aqueous solution is in the range of 30% to 95% by weight.

* * * * *